(12) United States Patent
Rajaie (10) Patent No.: US 9,430,654 B1
(45) Date of Patent: Aug. 30, 2016

(54) PROCESS OF DESTROYING DATA ON UNITS WITHIN AN ORGANIZATION WHEN THEY ARE NOT FUNCTIONING OR NO LONGER IN USE

(71) Applicant: Sepehr Rajaie, Pataskala, OH (US)

(72) Inventor: Sepehr Rajaie, Pataskala, OH (US)

(73) Assignee: TechR2, Columbus, OH (US)

( * ) Notice: Subject to any disclaimer, the term of this patent is extended or adjusted under 35 U.S.C. 154(b) by 0 days.

(21) Appl. No.: 14/875,995

(22) Filed: Oct. 6, 2015

(51) Int. Cl.
*B02C 25/00* (2006.01)
*G06F 21/60* (2013.01)
*G06Q 10/08* (2012.01)
*B02C 18/00* (2006.01)

(52) U.S. Cl.
CPC ........... *G06F 21/60* (2013.01); *B02C 18/0007* (2013.01); *B02C 25/00* (2013.01); *G06Q 10/087* (2013.01); *B02C 2018/0015* (2013.01)

(58) Field of Classification Search
CPC ... B02C 18/0007; B02C 25/00; G06F 21/60; G06F 11/006; G06Q 10/10; G06Q 50/18; G06Q 50/26
USPC ............. 241/36, 33, 100, 236; 700/224, 213
See application file for complete search history.

(56) References Cited

U.S. PATENT DOCUMENTS

| | | | | |
|---|---|---|---|---|
| 6,585,177 B2 * | 7/2003 | Castronovo | ............... | B09B 5/00 241/185.5 |
| 7,424,981 B2 * | 9/2008 | Castronovo | ......... | B02C 18/0007 241/28 |
| 7,871,025 B2 * | 1/2011 | Castronovo | ......... | B02C 18/0007 241/30 |
| 8,123,153 B2 * | 2/2012 | Kubo | .................. | B02C 18/0007 241/101.2 |
| 8,364,306 B2 * | 1/2013 | Rodriguez | .......... | B02C 18/0007 221/1 |
| 8,793,804 B2 * | 7/2014 | Bekker | ............... | H04L 63/0823 726/26 |
| 8,925,108 B2 * | 12/2014 | Herbach | ................. | G06F 21/60 726/28 |
| 2002/0008168 A1 * | 1/2002 | Castronovo | ............... | B09B 5/00 241/36 |

* cited by examiner

*Primary Examiner* — Faye Francis
(74) *Attorney, Agent, or Firm* — Furr Law Firm; Jeffrey M. Furr, Esq.

(57) ABSTRACT

The invention is a process that verifies that the unit that currently holds data or at one time held data has the data destroyed. This invention requires a secured database to hold information to prove that the units that currently hold data or at one time held data has the data destroyed. This invention provides unique identification to label the unit and to correlate with information provided. The invention requires a secure container to hold the unit after identification.

17 Claims, 13 Drawing Sheets

PROCESS OF DESTROYING DATA ON UNITS WITHIN AN ORGANIZATION WHEN THEY ARE NOT FUNCTIONING OR NO LONGER IN USE

CROSS-REFERENCES TO RELATED APPLICATIONS (IF ANY)

None

BACKGROUND

1. Field of the Invention

The present invention relates to a system to protect data more particularly either destroying the device on which the data is stored or overwriting the data using the DOD 3 pass standard.

2. Description of Prior Art

Data breaches from lost or stolen media are one source of large-scale data compromises. The average cost of a data breach is $5.4 million for 2013. One exposed hard drive from a company could cost $3,500,000 per record. Yet there is no set procedure for protecting this data when a hard drive or similar storage device needs to be replaced or destroyed. 62 data breaches were reported in 2013 that involved over 55.2 million records.

One of the leading causes of large-scale data breaches is lost or stolen media. It is estimated that 800,000 plus portable media are lost or stolen each year which includes USB, hard drives, data tape and CD/DVDs. 69% of these contained sensitive or protected information.

Many organizations fail to identify and track the data bearing units and if they do, it is not done electronically and with oversight. These failures result in missing devices and data and therefore data comprises.

Small and large organizations have stopped using layers of security involving individuals from multiple areas that would require large scale manipulation to successfully get away with taking a unit that currently holds data.

The unit that currently holds data or at one time held data fails due to the design or from malfunctioning components or the unit needs replaced for other reasons. It creates a problem to the organization that has the unit to keep the data from breaches, which can damage their corporate brands, and exposing them to legal risk and financial loss.

Currently their process of detecting and processing the unit that holds data or at one time held data are not within compliance of many regulations. This includes not knowing the serial number of data bearing device before its failure, not tracking the device at all, removing the device and then laying it around unsecured, taking devices with data outside the secure area for processing, using just one technician to conduct a critical data center procedure, no training certification, no reconciliation method to search for discrepancies, and no means for management oversight. So these other methods are not a complete and comprehensive solution, and do not meet the ISO 27001 standards.

There is still room for improvement in the art.

SUMMARY OF THE INVENTION

The present invention relates to a system where the unit that currently holds data or at one time held data fails due to the design or from malfunctioning components or the unit needs replaced for other reasons. It creates a problem to the organization that has the unit to keep the data from breaches, which can damage their corporate brands, and exposing them to legal risk and financial loss. The invention claimed here solves this problem.

The current invention involves an external certification that verifies that the unit that currently holds data or at one time held data has the data destroyed. This invention requires a secured database to hold information from the organization and from the company to prove that the units that currently hold data or at one time held data has the data destroyed. This invention requires a unique identification tag or other identification means to label the unit and to correlate with unit's information. The invention requires a secure container to hold the unit after identification.

The invention allows the organization to track the unit that currently holds data or at one time held data and then destroys the data to protect from data breaches. The system would have a machine that would automatically remove data from a unit.

The process is more efficient, effective, accurate and functional than the current art.

BRIEF DESCRIPTION OF THE DRAWINGS

Without restricting the full scope of this invention, the preferred form of this invention is illustrated in the following drawings:

FIG. 10 shows devices that invention is used with;

DESCRIPTION OF THE PREFERRED EMBODIMENT

There are a number of significant design features and improvements incorporated within the invention.

The present invention relates to a company having external certification that verifies that the unit that currently holds data or at one time held data has the data destroyed. This invention requires a certified secured database 310 to hold information from the organization and from the company to prove that the units that currently hold data or at one time held data has the data destroyed. This invention provides a unique identification to label an organization's device or unit and to correlate with information provided by the organization. The invention has a secure container to hold the unit after identification.

The process uses specialty and propriety software to access a data-holding unit to determine the point of failure. The invention uses secure containment devices 40 to hold devices and units that are to have their data removed or destroyed.

Figure 1:
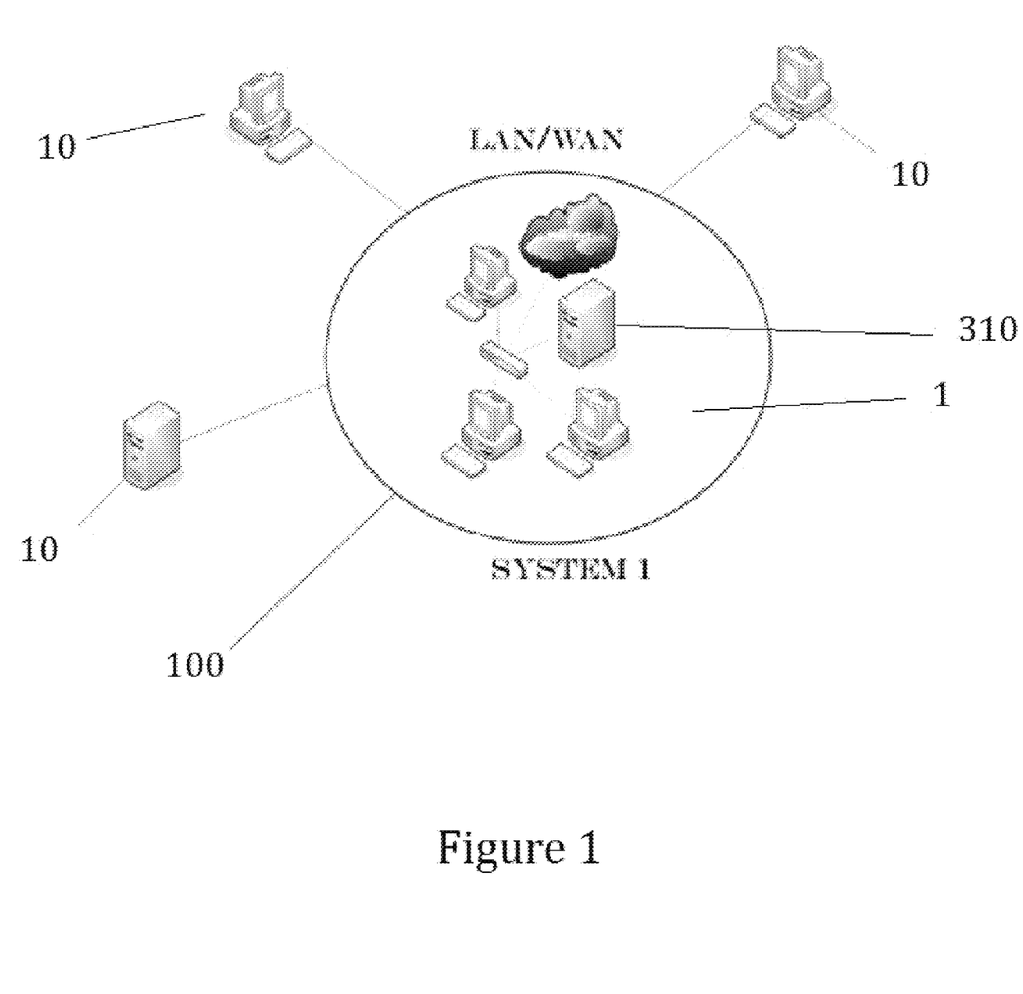
FIG. 1 shows an overview of how Users access the system.

FIG. 1 displays an embodiment of a system architecture 101 that can be used with the current invention. The system 101 is accessed from a user's computing device 10. A computing device 10 that can access the system 101 can be some version of a CPU, CPU memory, local hard disk, keyboard and display unit. A printer or multiple printers may also be included but are not required. The computing device 10 can be any desktop, laptop, tablet, smart phone or general purpose computing device with an appropriate amount of memory suitable for this purpose and an active connection to the TechR2 system 101. A reading mechanism 15 for reading bar codes or PID or other ID tag such as Radio Frequency ID (RFID) is attached to the computing device. Computing devices like this are well known in the art and are not pertinent to the invention.

The system 101 software and database 310 reside in the system's local or remote server architecture 100. The system 101 uses one or more memory means such as a standard hard drive or any other standard memory. The databases 30 are stored in the system memory means and the platform 101 changes the system's memory as it operates. The system can be written in a number of different programming languages and run on a number of different operating systems, database formats and platforms.

As stated above, the unit that currently holds data or at one time held data fails due to the design or from malfunctioning components. Or the unit needs replaced for other reasons. It creates a problem to the organization that has the unit to keep the data from breaches, which can damage their corporate brands, and exposing legal risk and financial loss. The invention claimed here solves this problem.

The invention allows the organization to track the unit that currently holds data or at one time held data and then destroys the data to protect from data breaches.

Figure 2:
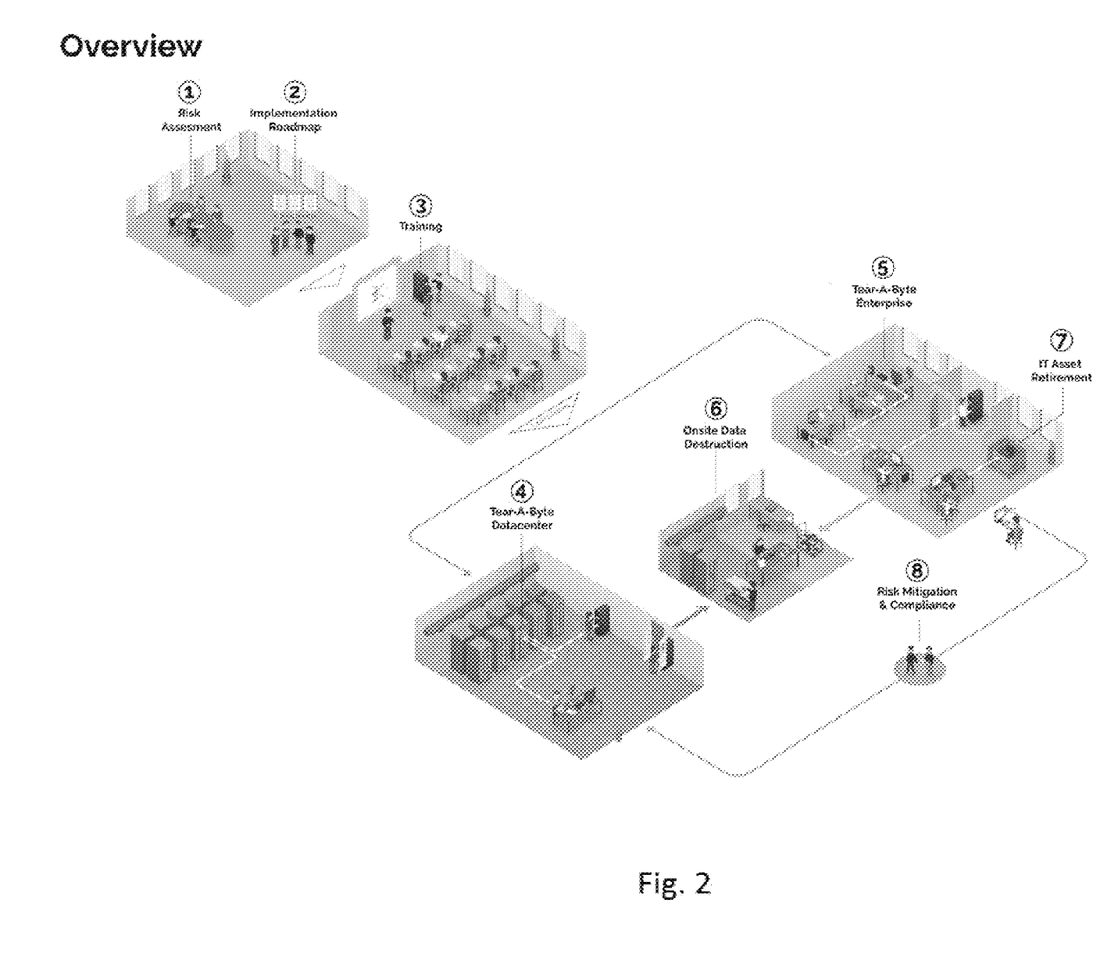
FIG. 2 shows an Overview of the process.
Figure 3:
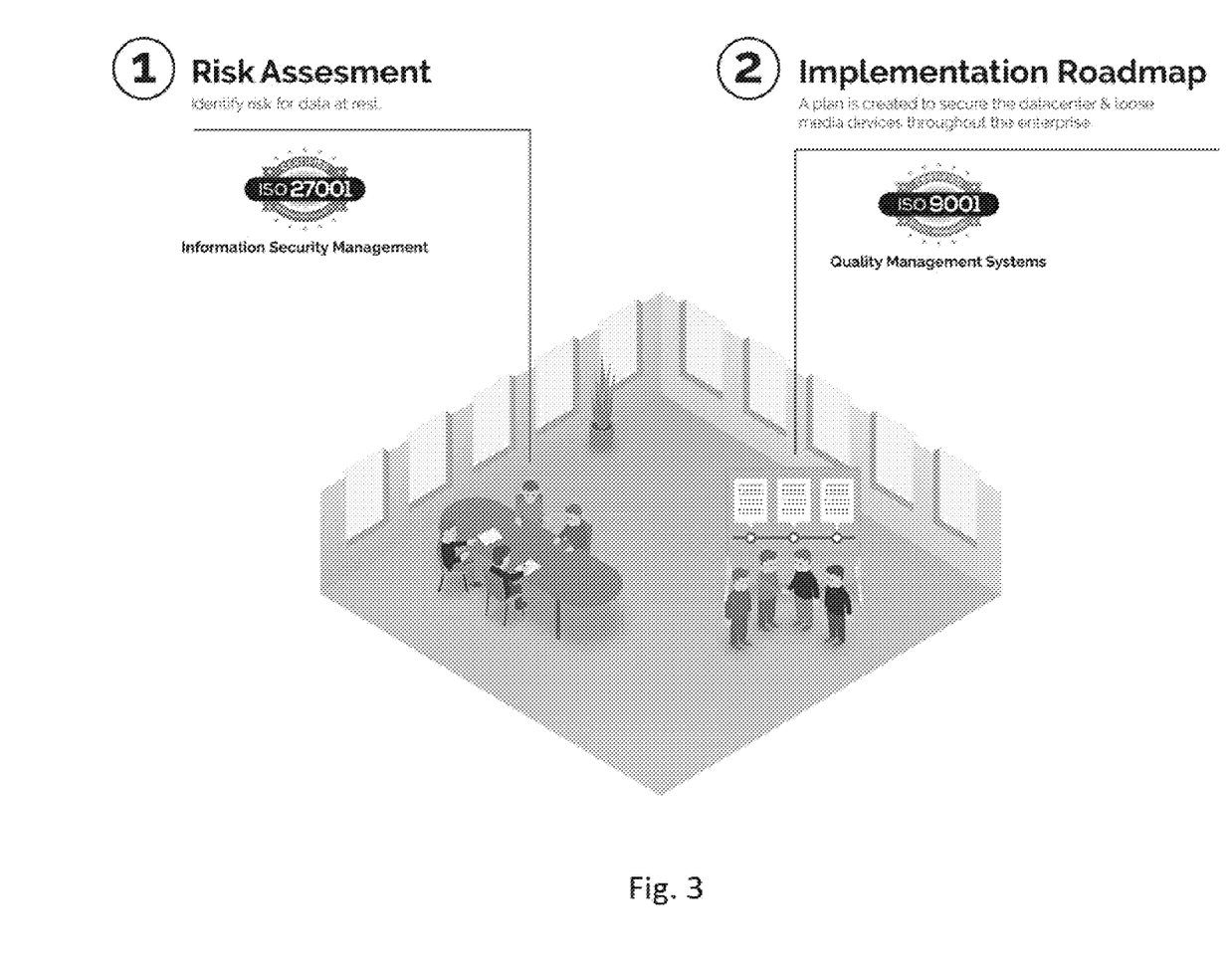
FIG. 3 shows Risk Management and Implementation.
Figure 4:
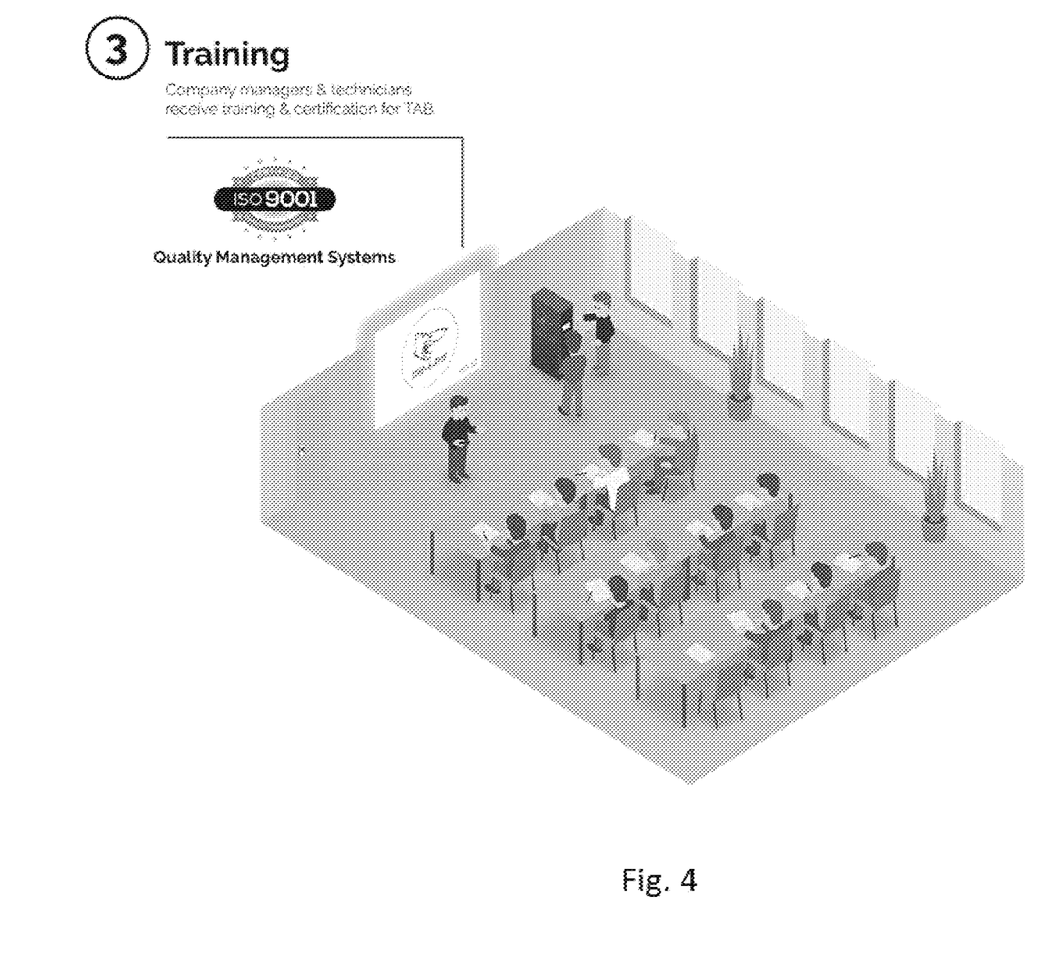
FIG. 4 shows training.
Figure 5:
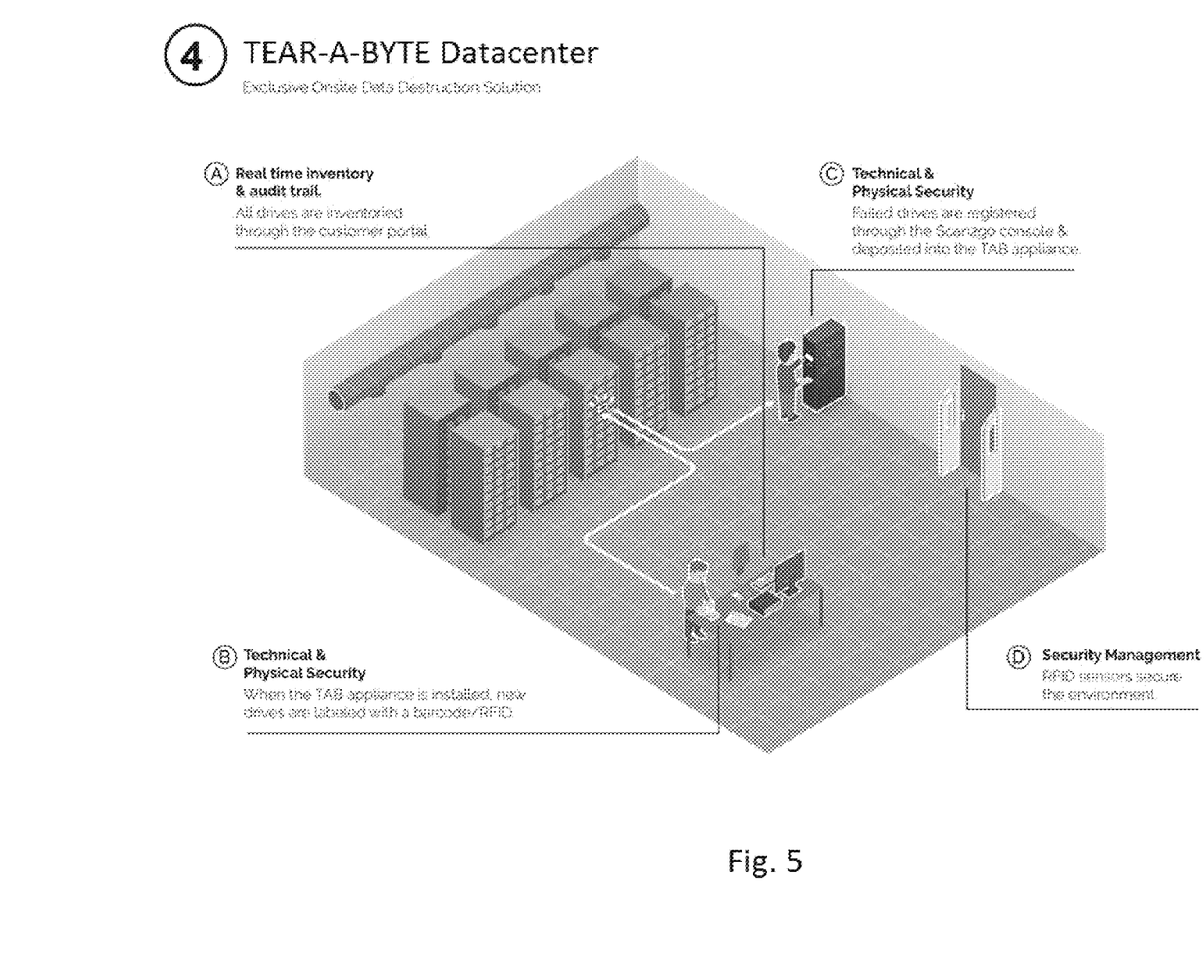
FIG. 5 displays the data center.
Figure 6:
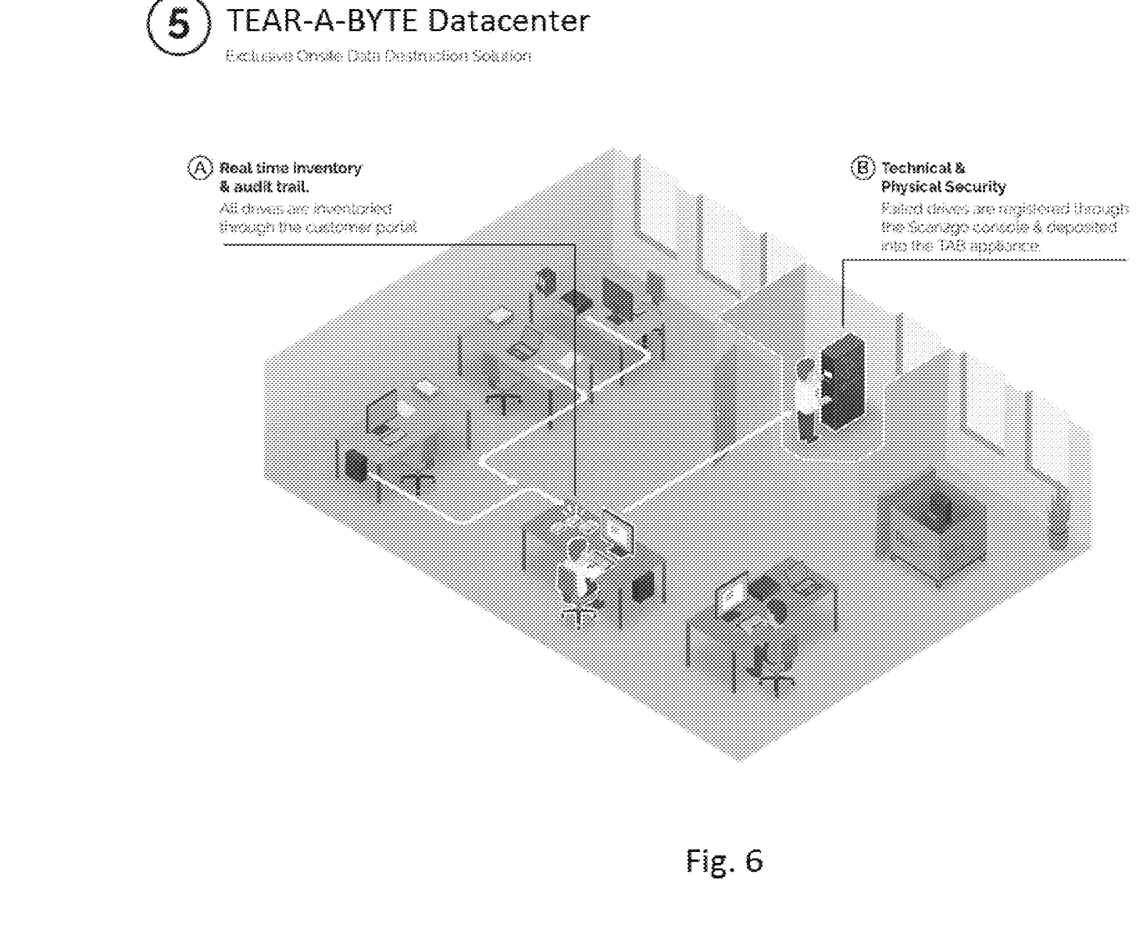
FIG. 6 displays the data center.
Figure 7:
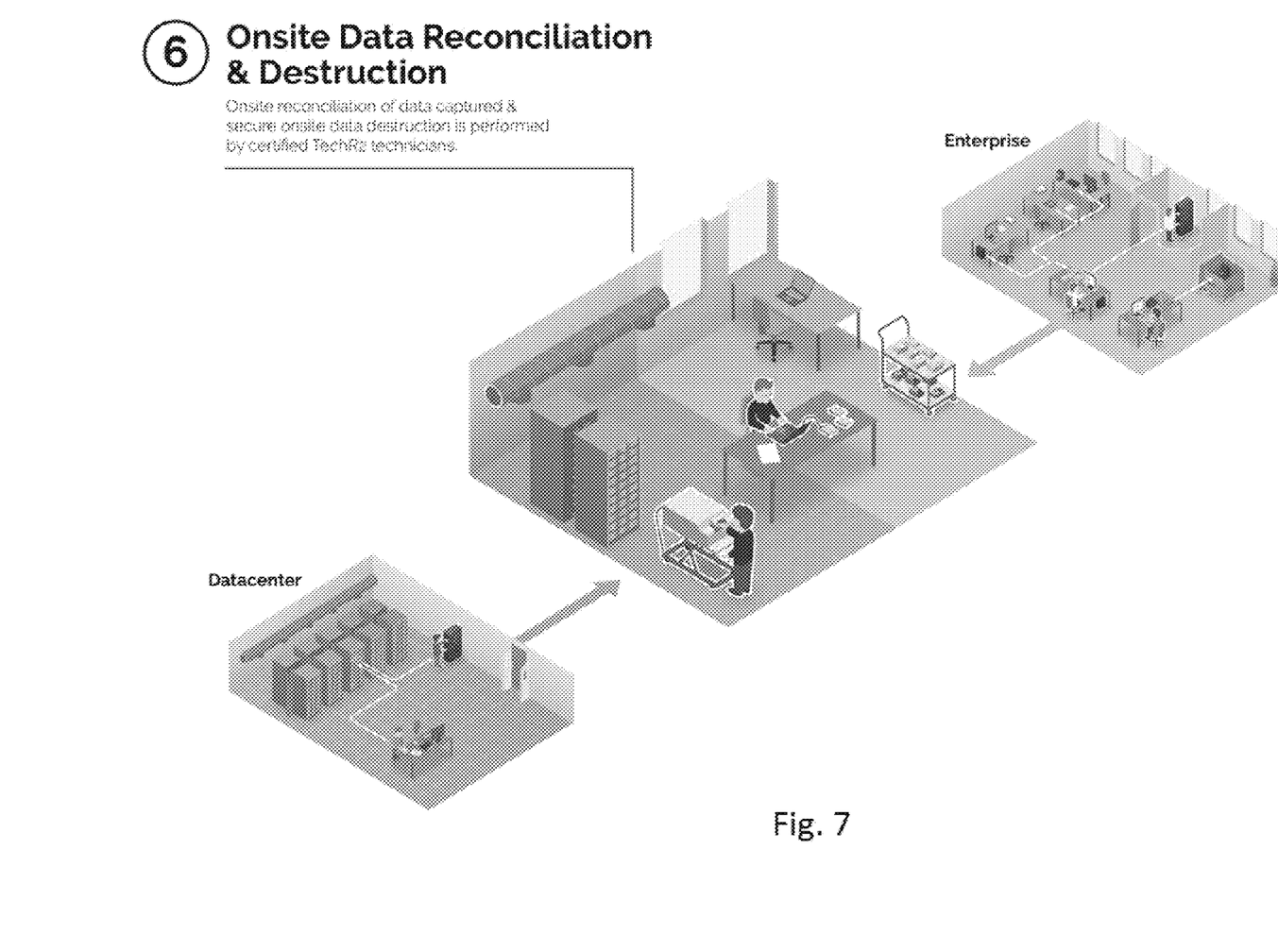
FIG. 7 shows destruction.
Figure 8:
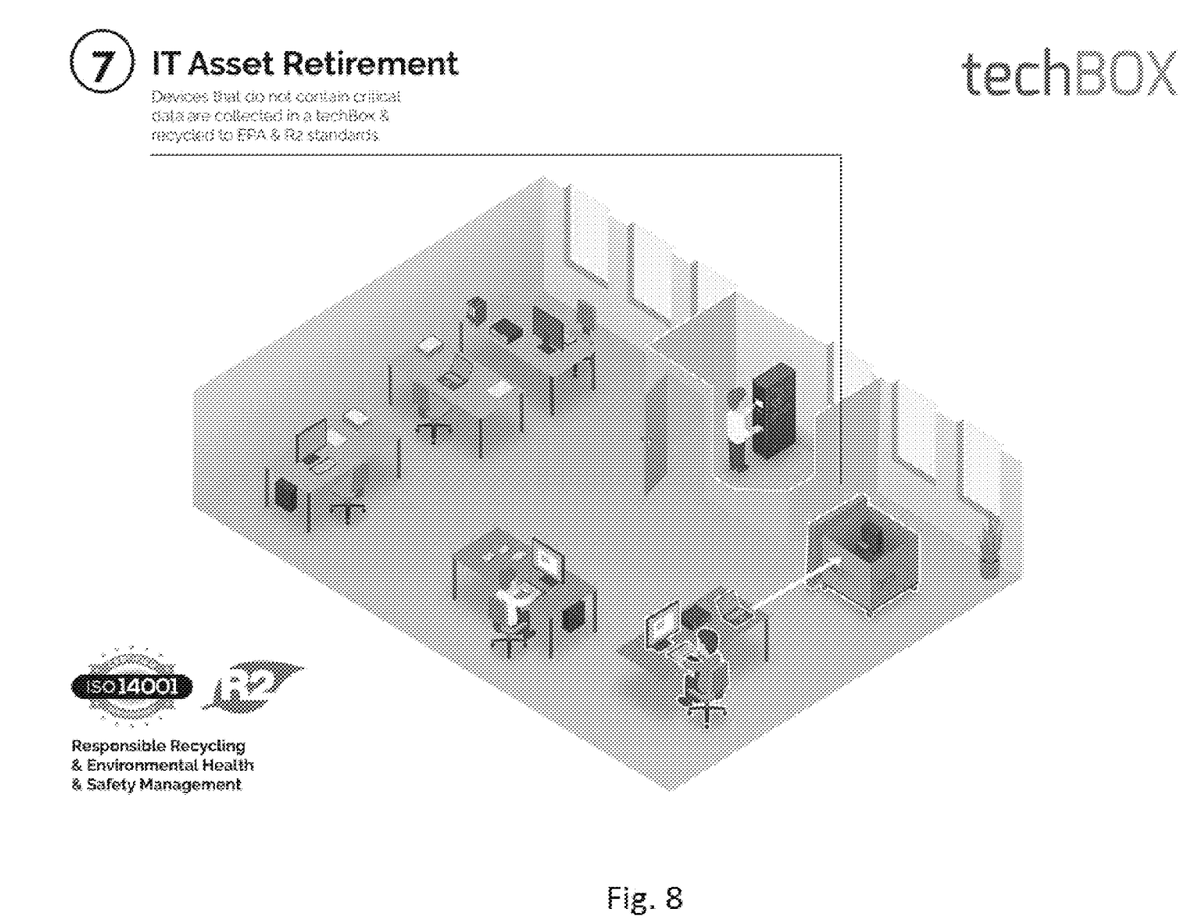
FIG. 8 displays asset retirement.
Figure 9:
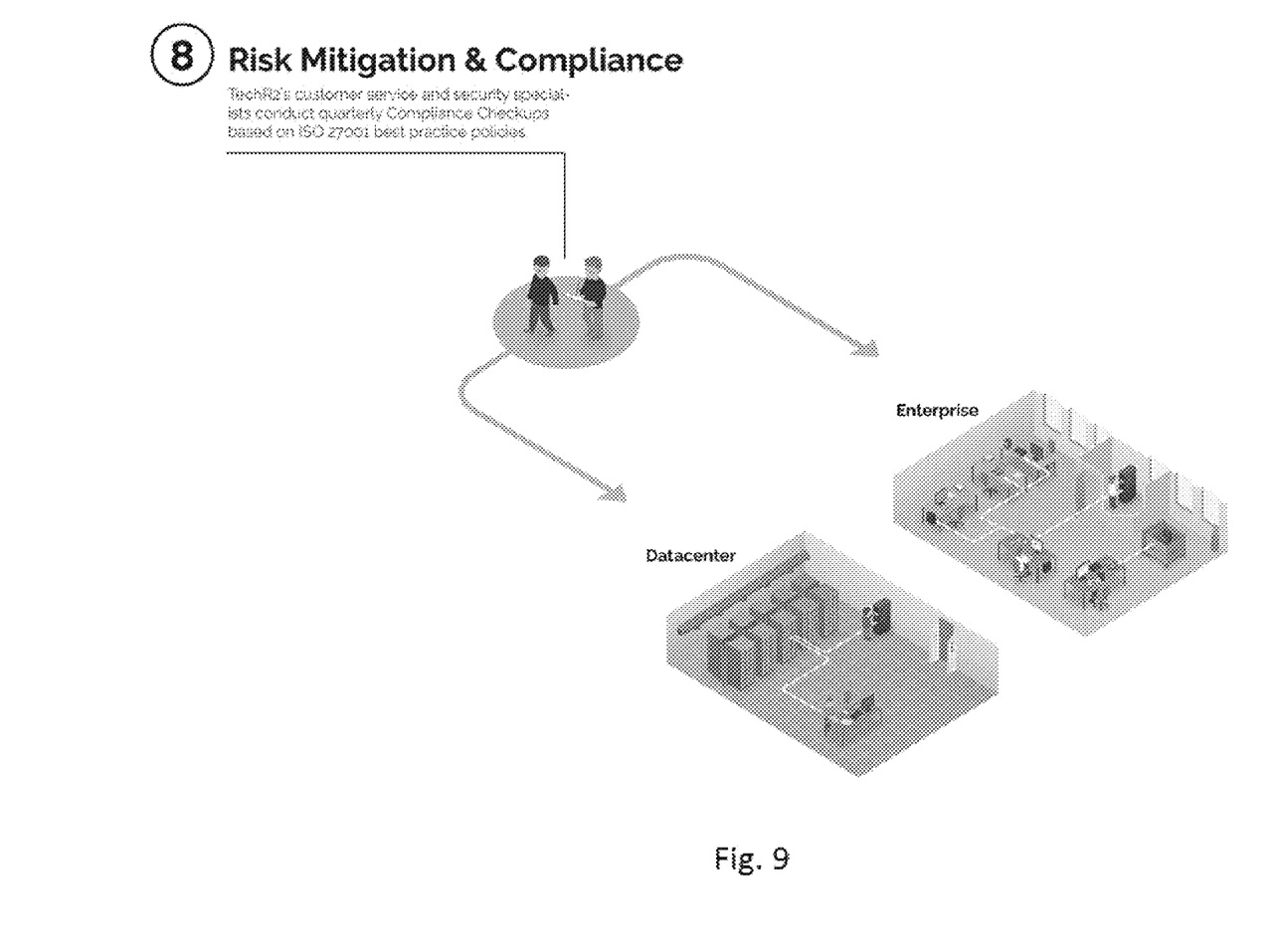
FIG. 9 displays Risk management and Compliance.

FIG. 2 shows an Overview of the process. This includes Risk management which identifies the data at risk as shown in FIG. 3. Implementation where a plan is developed to identify the devices that need to be destroyed as show in FIG. 3. Training is where the employees of a company are trained in FIG. 4. The data center where a real time inventory of all the devices are taken and the failed device or devices to be destroyed are deposited into the secure container as shown in FIGS. 5 and 6. The selected devices are destroyed as shown in FIG. 7. The devices that do not contain sensitive data are recycled and reclaim by depositing then in a recycle container as shown in FIG. 8. FIG. 9 displays Risk management and Compliance with periodic checkups.

Figure 10:
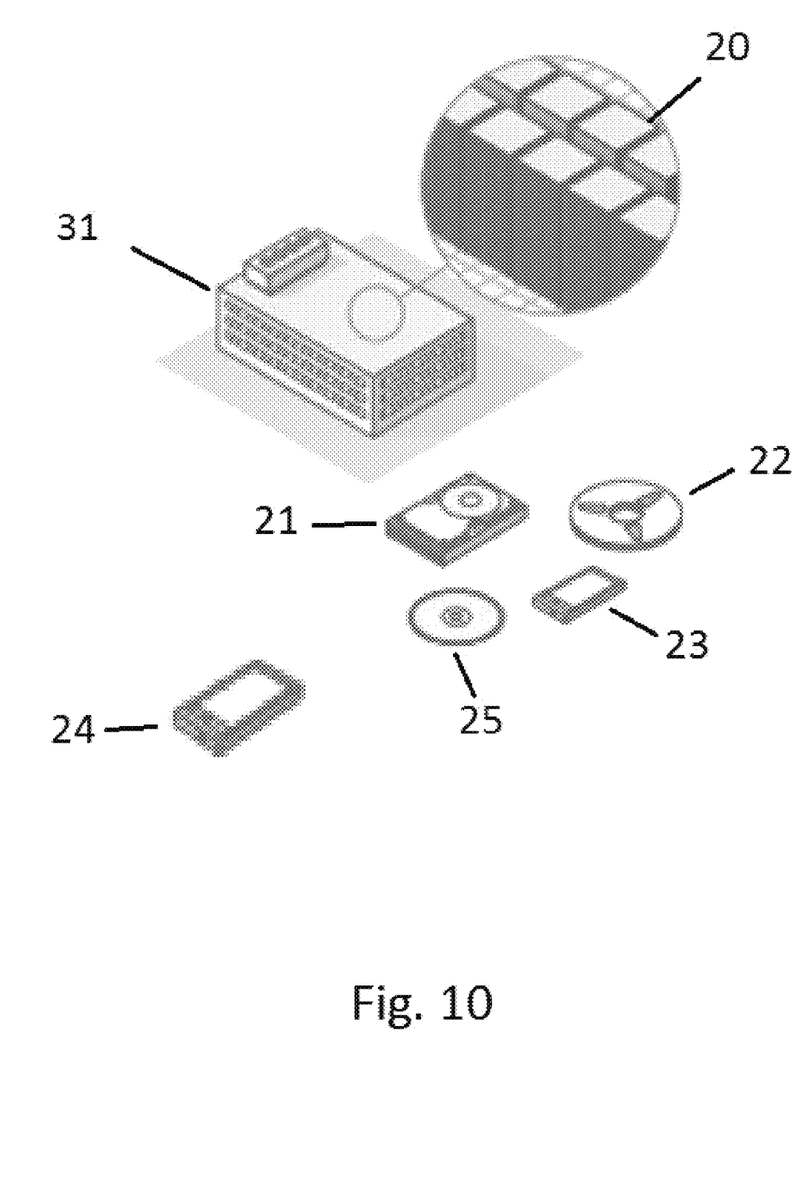

The invention is designed to be used with memory devices or units that may contain sensitive data. These devices include but are not limited to failed hard drives 20 from a data center 31, data drives 21, data tapes 22, cell phones 23, mobile devices 24 and CDs/DVDs 25 as shown in FIG. 10.

Figure 11:
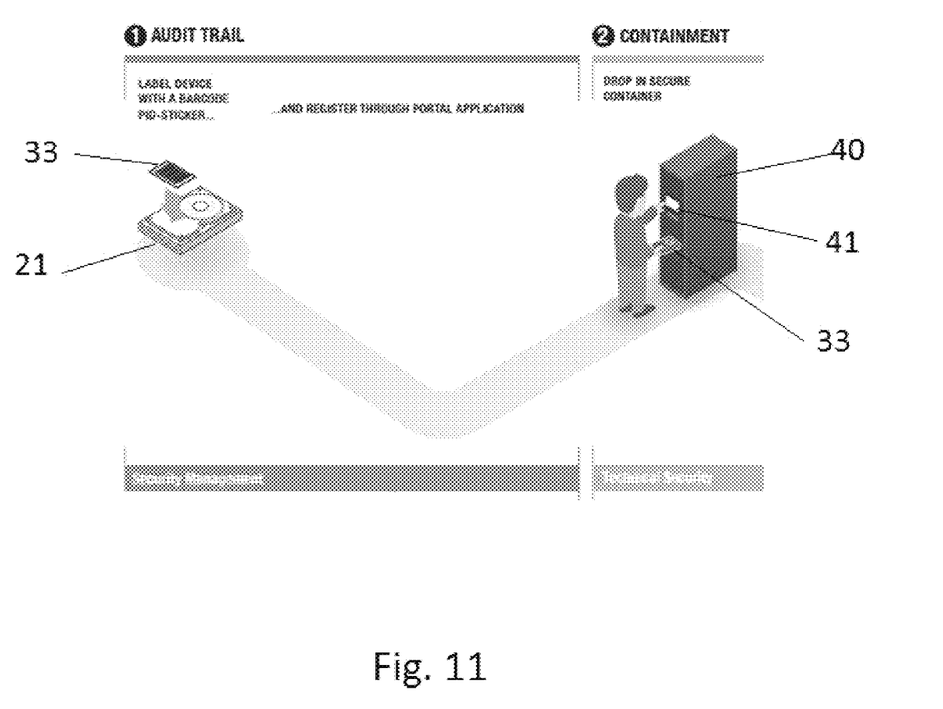
FIG. 11 displays Steps 1 audit trail and Step 2 Containment.

The organization determines that a device or unit has reached its end of life. The data on the device or unit that is no longer attached to the organization's network system, if compromised can harm their brand, and harm their customer. As shown in FIG. 11, to ensure tractability and that the device is actually destroyed with the data on it an electronic audit trail is created as the first step with a portal application. For the highest level of security, a tracking means such as a bar code 33 or a PID-sticker 31 or another such tagging method such as Radio Frequency ID (RFID) is place on the device and registered through a portal application using the appropriate reading mechanism 15 such as a bar code or RFID reader/writer. The data recorded by the reading mechanism 15 includes the unique ID code number, the serial number of the device and which server the device or unit was from if it is from a server. The portal application also records time stamps when the device or units come out of service and when it was put into containment. The portal application may also record the identifying data that is captured on the device. This creates an online audit trail and inventory of all the devices as they are placed into the process. The portal application is designed to run on a computing device 10 such as a PC, laptop, tablet or smart phone.

After the first step of being recorded through the audit and recording process the next step is containment where the device is placed into a secure container 40 as shown in FIG. 11. The secure container 40 has an input opening 41 where the device or unit is placed. In the preferred embodiment, the secure container 40 is locked and in the preferred embodiment is not accessible to the employees of the business.

Figure 12:
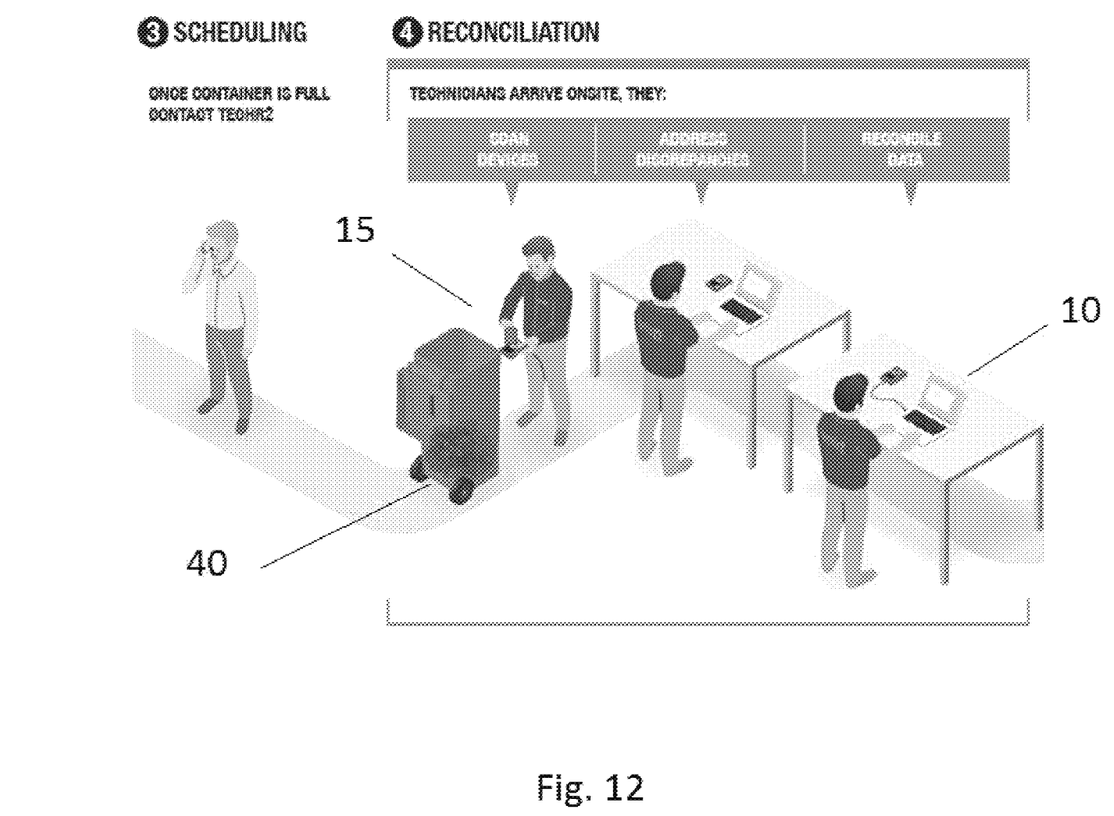
FIG. 12 displays Steps 3 scheduling and Step 4 Reconciliation.

Step 3 is scheduling as shown in FIG. 12, involve setting up a time to process the devices or units in the secure container 40 to destroy the devices or units and the data on them based on either a set time or when the secure container 40 is full. This can be done at the site which is normally a data center or have the secured container 40 taken to another location within the secure facility for processing.

Step 4, as shown in FIG. 12, is the important step of reconciliation. The secure container 40 is unlocked. The devices or units are scanned using the appropriate scanning method. This information will be compared to the audit trail created in step 1 using a computing device 10 to find any discrepancies. Any discrepancies found will be addressed and reconciled.

Figure 13:
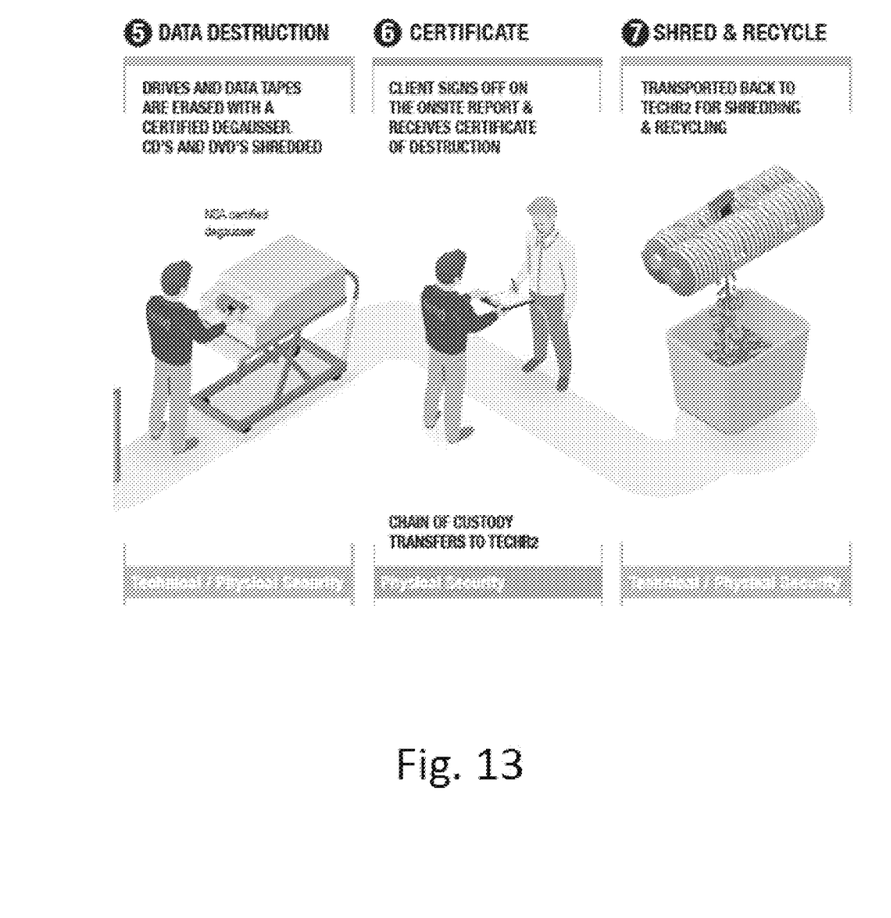
FIG. 13 shows Steps 5 Data Destruction, Step 6 Certificate and Step 7 Shred and Recycle.

Step 5, is the data destruction step, as shown in FIG. 13, where the devices or units such as failed hard drives 20 from a data center 31, data drives 21, data tapes 22, CDs/DVDs have their data in their electronic data storage completely and fully erased with an erasing means such as a certified Degausser. Solid state devices are wiped with specialized software. Units that cannot wiped are shredded and/or crushed to industry standards so the data cannot be read by any means known. This step insures that none of the sensitive or secure data can be disclosed and is completely destroyed. In the preferred embodiment, these critical steps are completed by two trained technicians which meet the ISO security standards.

Step 6 is the Certificate step as shown in FIG. 13, where the system produces an online report which is signed off on by the company and generates a certificate of destruction with liability indemnification upon the completion.

Step 7 is the shred and recycle step shown in FIG. 13. In this step the devices are destroyed using state-of-the-art secure destruction either on site or at another site such as a third party's secure location. In this step in the preferred embodiment, a new person identifies the device again and physically destroys it. At this point four people have processed the data bearing device. The customer, the two people processing it at the data center and lastly the person destroying the device. This creates multiple layers of security that is very difficult to defeat and would result in a lost or compromised data bearing unit. In the preferred embodiment, this is done based on environmental recycling to EPA requirements. The devices or units can be shredded using a shredding means 60.

Steps 1 audit trail and 4 reconciliation are security management steps. Steps 2 containment, 5 data destruction and 7 shred and recycle are technical/physical security steps. Step 6 certificate is a physical security step.

So it is important to state this process can happen anywhere. For instance, a person can remove their data bearing device from a computer or server and then apply the ID sticker to it and then deposit the unit in a secure container 40. This container 40 can be in a data center or any business location. In alternate embodiment, in some cases, organizations can choose to tag and track the devices from integration into their system until data bearing device destruction. In the current art, users many times remove the data bearing device to their truck that have a shredder where it can be stolen, in the preferred embodiment the process never brings the data bearing device into the public.

The person would have to obtain multiple worldwide industry ISO standards that certify their processes. The current invention is a system that allows users and certified security personnel to input and inspect information about the unit that currently holds data or at one time held data. It is a process to uniquely identify the unit that currently holds data or at one time held data. The system secures the device or unit that currently holds data or at one time held data until the data or the unit is destroyed. It provides an audit trail that will follow the device or unit and the removal of data from the unit that currently holds data or at one time held data. A person would have to have the resources to examine and follow the audit trail.

Advantages

By following the process in the current invention, an organization or company can be highly satisfied that the unit that is holding secure data or at one time held data has been cleaned. This alleviates the potential problem of damaging their brand due to secure data becoming available on the global network, which saves the organization time and effort in marketing and answering claims in the legal system regarding data breaches.

Additionally: Any organization that wants to securely remove not only digital information, but also destroy mechanical information such as a shape and size of a design would want to use a secure system as described to ascertain that the data no longer exists. Therefore, the process would protect the organization from compromise, which would save them from spending time and resources to counteract the loss.

Conclusion

Although the present invention has been described in considerable detail with reference to certain preferred versions thereof, other versions are possible. Therefore, the point and scope of the appended claims should not be limited to the description of the preferred versions contained herein. The system is not limited to any particular programming language, computer platform or architecture.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A process comprising the steps of:
    having a plurality of non-transitory memory devices with the memory devices containing data;
    tagging the non-transitory memory device with an unique ID tag;
    recording information about the non-transitory memory device on an electronic means creating an audit trail;
    placing the non-transitory memory device in a secure container;
    removing the non-transitory memory device from the secure container;
    confirming that the recorded information about the non-transitory memory device matches the recorded information by reviewing the audit trail for discrepancies;
    destroying the data on the non-transitory memory device if the record information matches;
    destroying the non-transitory memory device if the recorded information matches;
    having a real time portal to relay to the status of the non-transitory memory devices; and
    providing certification that the data on the non-transitory memory was destroyed.

2. A method according to claim 1 including the step of reading the information about the non-transitory memory device after removing it from the secure container.

3. A method according to claim 2 using a reading mechanism to read the information.

4. A method according to claim 1 where the ID tag is a bar code.

5. A method according to claim 1 where the ID tag is a Radio Frequency ID.

6. A method according to claim 1 where the information includes one or more of the following a unique ID code number, a serial number, the data on the device and/or where the device was from.

7. A method according to claim 1 where the information includes time stamps of when the non-transitory memory device was taken out of service.

8. A method according to claim 1 where the information includes time stamps of when the non-transitory memory device was placed in the secured container.

9. A method according to claim 1 including a step of having criteria on when the non-transitory memory devices in the secured container are removed for processing.

10. A method according to claim 1 using a portal application to record the information.

11. A method according to claim 1 where the destroying the data is done on-site.

12. A method according to claim 1 where the destroying the non-transitory memory devices is done off-site.

13. A method according to claim 1 where destroying the non-transitory memory device is done by shredding.

14. A method according to claim 1 where the secured container cannot be accessed by a customer who placed non-transitory memory devices into the secured container.

15. A method according to claim 1 where if there are discrepancies in the audit trail correct those discrepancies.

16. A method according to claim 1 where the non-transitory memory device cannot be removed from the secure container without permission.

17. A process consisting of the steps of:
    having a plurality of non-transitory memory devices with the non-transitory memory devices containing data;

tagging the non-transitory memory device with a unique ID tag;

recording information about the non-transitory memory device on an electronic means creating an audit trail;

placing the non-transitory memory device in a secure container;

removing the non-transitory memory device from the secure container;

confirming that the recorded information of about the non-transitory memory device matches the recorded information by reviewing the audit trail reviewed for discrepancies;

destroying the data on the non-transitory memory device if the record information matches;

destroying the non-transitory memory device if the recorded information matches and where there are discrepancies in the audit trial correct those discrepancies;

having a real time portal to relay the status of the non-transitory memory devices; and providing certification that the non-transitory memory device was destroyed.

\* \* \* \* \*